United States Patent [19]

Carlsson

[11] 4,132,638

[45] Jan. 2, 1979

[54] AEROBIC, THERMOPHILIC DEGRADATION WITH ENZYME ADDITION

[75] Inventor: Carl-Göran H. Carlsson, Tomelilla, Sweden

[73] Assignee: PLM AB, Sweden

[21] Appl. No.: 813,742

[22] Filed: Jul. 7, 1977

[30] Foreign Application Priority Data

Jul. 7, 1976 [SE] Sweden ............................... 7607763

[51] Int. Cl.$^2$ .......................... C02C 1/06; C02C 5/10
[52] U.S. Cl. ........................................ 210/7; 210/10; 210/11; 210/12; 210/14; 210/15; 210/18; 210/44
[58] Field of Search ............................. 210/2, 3, 4–6, 210/7, 10, 14, 12, 15, 18, 44, 63 R, 11

[56] References Cited

U.S. PATENT DOCUMENTS

| | | | |
|---|---|---|---|
| 2,852,584 | 9/1958 | Komline | 210/10 |
| 3,047,492 | 7/1962 | Gambrel | 210/15 |
| 3,053,390 | 9/1962 | Wood | 210/219 |
| 3,236,766 | 2/1966 | Levin | 210/18 |
| 3,356,609 | 12/1967 | Bruemmer | 210/11 |
| 3,462,275 | 8/1969 | Bellamy | 210/10 |
| 3,476,683 | 11/1969 | Liljeren | 210/10 |
| 3,487,014 | 12/1969 | Liljegren | 210/4 |
| 3,617,539 | 11/1971 | Grutsch | 210/18 |
| 3,635,797 | 1/1972 | Battistoni | 210/11 |
| 3,730,883 | 1/1973 | LeFrancois | 210/12 |
| 3,734,850 | 5/1973 | Karr | 210/3 |
| 3,864,247 | 2/1975 | Fuchs | 210/12 |
| 3,883,424 | 5/1975 | Stambesky | 210/15 |
| 3,915,853 | 10/1975 | Luck | 210/11 |
| 3,961,078 | 6/1976 | Stitt | 210/11 |
| 4,000,064 | 12/1976 | Romell | 210/12 |

FOREIGN PATENT DOCUMENTS

| | | | |
|---|---|---|---|
| 5125560 | 7/1976 | Japan | 210/15 |

OTHER PUBLICATIONS

Enzymes and Sludge Digestion, Sewage Works Journal, Sep. 1932, 782–787.
The Operator's Corner, Larson, 1954 Operator's Forum, pp. 612–615.

*Primary Examiner*—Charles N. Hart
*Assistant Examiner*—Ernest G. Therkorn

[57] ABSTRACT

The disclosure relates to a process for the aerobic, thermophilic degradation, in the liquid phase, of microbially degradable substances. In the process, the particle size of the substance is reduced before the treatment to be at most 50 mm, and the substance is mixed with a liquid to a dry content of at most 15% by weight. The pH of the resultant slurry is adjusted to at most 12. Enzyme is added to promote degradation prior to preheating. The slurry is then pre-heated and thereafter subjected to a continuous, aerobic, substantially thermophilic degradation treatment in the presence of air for at most 10 days. The temperature of the slurry is regulated to from 40 to 80° C. Finally, active sludge from the treatment is utilized for inoculating untreated slurry and ready-treated slurry is dewatered and possibly enriched with nutrient.

19 Claims, No Drawings

AEROBIC, THERMOPHILIC DEGRADATION WITH ENZYME ADDITION

The present invention relates to a process for the aerobic, thermophilic degradation, in the liquid phase, (wet composting) of microbially degradable substances.

It is previously known, by the so-called dry-composting method, to compost solid matter and stabilize more or less unthickened waste water. The prior art processes are generally time-consuming because of the low reaction level and are mostly carried out batchwise. The present invention differs from the prior art int. al. in that it does not relate to dry composting but to wet composting and in that it embraces a continuous process with a high level of reaction. A further characteristic feature of the present invention is that, as opposed to the simple small-scale degradation of so-called domestic and human body waste, it relates instead primarily to the management and degradation of waste and sludge from municipal treatment plants, different industries (primarily the forestry industry including pulp, board etc.), the food-stuffs and fermentation industries. Above all, the great amounts of waste which are involved in the above industries entail that completely different, and much stricter, requirements are placed on the planning of the degradation process than in the simpler type of treatment which is involved in the degradation of domestic waste. In order that the process be rational and economically viable, it must be possible to deal with great amounts of waste in a short time and with simple equipment, both as regards machinery and surveillance, the latter requiring a continuous process. However, the art has previously lacked such a rapid, continuous, effective, aerobic wet composting process for the management and degradation of large amounts of waste from, primarily, the above-mentioned sources. The invention having obviated this shortcoming, it can be said that the state of the art has been greatly improved. For example, it is possible thanks to the present invention to replace, in municipal waste water treatment plants, the anaerobic digestion tanks which often function unsatisfactorily and may give rise to unpleasant smell. A further advantage in the present invention as compared with the anaerobic digestion tank process is that the aerobic process according to the invention creates a considerable amount of heat which raises the treated material to a temperature of up to 80° C, whereby pathogenic and parasitic organisms as well as weed seeds are rapidly killed off. Moreover, because of the fact that the mixing conditions in the process according to the present invention are intensive, the antibiotic effect will be rapid and powerful as well as the heat transfer in the bulk phase, the temperature conditions thus becoming homogeneous and stable, in other words there will be no untreated zones. Finally, in the process according to the present invention, excess heat is created which may be utilized for the pre-heating of waste which is to be treated, or can be utilized for other purposes such as water heating.

In order to achieve the necessary level of reaction and rapidity in the process according to the present invention, certain critical conditions as regards the particle size, dry matter content and pH must be satisfied. Moreover, the process may be accelerated further by an addition of certain enzymes or by the recirculation of active thermophilic substances which assist in the degradation process and/or the dewatering of the treated matter.

Total or almost total optimation of the degradation process which takes place in the liquid phase is realized by the present invention. The reaction in the liquid phase entails, in aerobic, thermophilic processes, that the mass transport in the border layer of the micro-organisms essential to the reaction speed and reaction yield can be controlled in a desired manner by the control and regulation of applicable parameters in the liquid mass, such as temperature, agitation speed and intensity, duration of stay, amount of air and/or oxygen, gas bubble size, $CO_2$ addition, total and partial pressure of the gas phase, pH level, dry matter content, available carbon and nitrogen etc. In the present invention, all of these essential parameters are optimated.

Thus, in the light of the above, the present invention provides a process for aerobic, substantially thermophilic degradation, in the liquid phase, of microbially degradable substances, in which process the particle size of the microbially degradable substance is reduced so as to be, prior to degradation, at most 50 mm and the substance is mixed with a liquid to a dry content of at most 15% by weight for producing a slurry whose pH is regulated to at most 12, the slurry being preferably exposed to degradation promoting enzymes and being pre-heated to a temperature of from 40-80° C, and the thus pre-heated slurry is then subjected to a continuous, aerobic, substantially thermophilic degradation treatment under the action of aerobic, primarily thermophilic micro-organisms in the presence of air for a period of time of at most 10 days, the temperature of the slurry during the thermophilic degradation being regulated in the necessary manner to from 40-80° C, preferably from 55-65° C, and active sludge formed during or after the degradation treatment and containing aerobic, primarily thermophilic micro-organisms is utilized for inoculating untreated slurry. Finally, remaining ready-treated slurry is dewatered to a varying extent and possibly enriched with nutrient or conditioned in another manner in order to serve as soil improver.

The process according to the present invention will now be described by way of the disclosure of the different process stages.

Depending upon the particular starting material which is used in the process according to the invention, that is to say, unthickened or thickened waste water, sludge from municipal waste water treatment plants, the forestry industry, the food-stuffs industry, the fermentation industry etc., or other organically active waste from such industries, for example, potato peelings, care must first be taken to see that the material satisfies the necessary requirements of trituration. The reason for this is that in order to realize high reaction level in the degradation and for achieving satisfactory dewatering and manageability of the product, it is important that the material be of so small a particle size as possible. On this point, a maximum particle size of 50 mm has been assessed as correct in the present invention, and preferably, the starting material should have a particle size which is less than 10 mm, more precisely within the range of from 0.0001-10 mm, the smaller the particle size, the better the result. The larger particle sizes of up to 50 mm in the starting material are used only if the particle size is moreover subjected to reduction during the process itself, for example when the mixing of the liquid slurry is carried out by means of a milling pump which produces a final particle size of at most 10 mm.

Generally, the final particle size of the wet-composted, microbially degraded substance should be as little as possible and not exceed 10 mm.

Once the particle size of the microbially degradable substance has been regulated in accordance with the above, the requisite dry matter content of the substance is adjusted by the addition of liquid if such is necessary. The substance should, for the purposes of the present invention, be present in the form of a pumpable liquid slurry, which restricts the dry matter content of the slurry to at most about 15% by weight, normally from 1–12% by weight.

At the same time as, or after the adjustment of the dry matter content, the pH of the slurry is adjusted in order to be at the optimum level as regards the microbial degradation. In this instance, a pH of higher than 12 is unsuitable, and preferably the pH should be in the region of from 3.5 to 10.

For realizing an optimum degradation process, it is a further characteristic feature of the present invention that enzymes are then preferably added to the liquid slurry which contains the microbially degradable substance. The reason for this is that the microbial degradation of large and complex molecules and compounds takes place, as a rule, in that enzymes given off from the micro-organisms split off the molecules and compounds into fragments which can be absorbed and converted by the microorganisms themselves, aerobic, thermophilic degradation of organic material giving substantially carbon dioxide and water as the end product. By the addition of different specific enzymes, alone or in combination with each other, the splitting-off of the molecules and the compounds is accelerated before and during the reaction phase in which the degrading organisms themselves produce such enzymes. In this reaction, the splitting-off takes place surprisingly rapidly and completely as compared with the reaction without special enzyme additives, since split-off substances are available for absorption in the micro-organism cells. Enzyme additives which come into consideration here are amylases, lipases and proteinases. As was suggested above, the enzymes are added before or during the actual degradation reaction, it being suitable to add the enzymes at the beginning of the degradation reaction in view of the short life-span and activity duration of the enzymes. The enzyme additive is effected in an amount of from 0.01–10% by weight calculated on the amount of dry organic substance in the slurry.

Moreover, in the forced enzymatic splitting-off of organic waste matter which often has a network-forming molecular structure of the polysaccharide type, the water held captive in the sludge is released much more simply than in spontaneous reactions without a special enzyme additive, for which reason a surprisingly higher level of dewatering is obtained in a substantially shorter time in forced splitting-off. In particular, this effect is obtained when amylases are added, it being possible to achieve dewatering speeds which are up to several hundred times faster than after corresponding spontaneous degradation processes.

In conjunction with the special addition of enzymes, further optimation of the process according to the present invention can be achieved by the special addition of specific mesofilic and/or thermophilic inoculation cultures in an amount of up to 5% by weight. Many such cultures can be obtained in the form of freeze-dried bacterial masses. In, for example, the degradation of human body waste, a degradation process can be realized which is up to 50% more rapid as compared with spontaneous degradation utilizing the organisms naturally included in the waste. However, it should be observed that when a particular addition of inoculation culture is utilized, this should be effected preferably only in the initial stage of the degradation process, that is to say, at the initiation of the process, since when a suitable bacteria culture has been obtained by the process itself, inoculation can simply be effected by recirculation (which in turn can be optimated) of sludge from the active stage to the in-flow. A special addition of inoculation culture is then effected at certain intervals for preventing a change in the microbial properties int. al. through mutation of the active strains.

The addition of different enzymes and inoculation cultures can be combined with each other and give, in the present invention, a superposed and surprisingly much greater degradation effect than the addition of solely enzymes or solely inoculation culture. However, the simultaneous addition of proteinase and inoculation culture should be avoided.

Furthermore, for rapidly achieving high degradation speed, it is advisable to pre-heat the liquid slurry of biologically degradable substance before it is introduced into the degradation reactor. This pre-heating is suitably effected by means of a conventional heat exchanger making use of excess heat which is produced in the thermophilic degradation process. In this context, the pre-heating temperature lies in the range of from 40–80° C, preferably from 55–65° C.

After the above-described preparatory stages, the liquid slurry which contains the microbially degradable substance is to be subjected to aerobic, primarily thermophilic degradation, it being necessary, for maintaining the degradation reaction, that the slurry be supplied with oxygen-containing gas, such as air, and be agitated. The agitator should be such that it is capable of working through the slurry volume in the degradation reactor within at most about 50 hours, preferably from 0.2–5 hours.

Depending upon the design of the reactor which is used for the degradation reaction proper, the supply of oxygen-containing gas and the agitation of the slurry can be effected in different ways. The continuous degradation reaction in the process according to the present invention allows for the use of a number of different types of reactors, such as single and coupled tank and tube reactors, towers, columns and vessels with or without fillers and base-plates corresponding to distillation columns, adsorption towers for gas and liquid and evaporators. The fillers may be of varying configuration, such as raschig rings, saddles and the like, whereas the bottoms are int. al. of the bell, valve and sieveplate type. Furthermore, different forms of guide and deflector plates are provided for the fluid streams. Among the tube reactors, particular mention should be made of the so-called Static Mixer used in different chemo-technical applications. It should, in this context, be emphasized that the invention is not restricted to any particular form of reactor apparatus, the conditions for the present invention being satisfied as long as the reactor in question permits of a continuous process with satisfactory gas supply and agitation of the slurry. In view of the importance which correct gas mixture and agitation have for the process according to the present invention, it is nevertheless to be particularly preferred (not least from the points of view of function and service) to arrange the agitation of the liquid slurry separately or externally with regard to the degradation reactor proper. This is effected suitably in the form of a fan or pump which agitates the slurry and imparts to it a driving potential for conveyance further. In cases where the degradation reactor consists of a single or several series-connected tank reactors with continuous through-flow of the slurry which is being subjected to microbial degradation, a pump or fan is, thus, disposed in association with the tank reactor or in association with each tank reactor, the pump receiving a partial flow of greater or smaller volume from the reactor and, during agitation, conveying the slurry either back to the same reactor and/or to the subsequent reactor tank.

A heat exchanger of the conventional type is preferably connected to the pump or fan for extracting heat from the slurry and thereby achieving temperature-regulation of the thermophilic degradation reaction. As was suggested above, use is made of the extracted heat for pre-heating the liquid slurry which is to be subjected to the degradation treatment.

In view of the fact that the pumped slurry contains active sludge formed in the degradation reaction, the slurry flow from the pump or fan can, when recycling is effected to the same reactor, be coupled to the flow of new, untreated slurry entering into the reactor, for thereby achieving inoculation of the fresh slurry with bacteria culture.

The driving potential (obtained from the pump or fan) in the slurry is preferably used for realizing effective admixture of additives such as air into the liquid mass, in that the slurry is led through an injector prior to being introduced into the reactor. In such an injector, liquid such as an enzyme solution or a solution containing a nitrogen source can be also admixed apart from streams of additive gas such as air. The nitrogen source is admixed here for regulating the C/N ratio so as to lie between 1:1 and 100:1, which is suitable for obtaining the best bacteria growth in the degradation. The use of an injector has been found, in the present invention, to give superior mixture because of the particular mixing conditions "mixing shock" and "froth flow" which prevails in the compression and expansion portion, respectively, of the injector. The special admixture of air or other gas will, in this case, be very rapid and effective with almost instantaneous dissolution of the gas in the liquid.

In order that the aerobic degradation reaction proceed at satisfactory speed, the supply is necessary of up to 25 liters of air per liter of slurry and second, preferably from 0.05–10 liters of air per liter of slurry and minute.

In cases where the pump or fan is utilized only for agitation and gas introduction (and thus does not deal with the continuous introduction to and removal from the degradation reactor or reactors), it is not necessary to run the pump or fan continuously, intermittent operation being sufficient, and often even advantageous. Depending upon the mass transport in the system and upon the aspiration and respiration capacity of the microorganisms, the down-time pauses can be controlled with such that the ratio down-time:working-time is from 0.01:1 to 25:1. This entails a considerable reduction in operation costs which to a great extent consist of energy costs to the pumping and driving machinery.

Thus, even if agitation of the liquid mass by means of a pump or fan in combination with an injector for gas introduction is to be particularly preferred in the present invention, it is nevertheless possible (although less preferred) to utilize internal agitation in the degradation reactor by means of a conventional agitator combined with air introduction by means of a nozzle, or by the downward impact of circulating liquid flow on the free liquid surface in the reactor. However, these methods of gas admixture are less effective as compared with gas admixture by means of a injector.

The above-discussed recycling of the slurry from the degradation reactor is a characteristic feature of the present invention which not only allows for simple and uncomplicated inoculation of in-flowing unprocessed liquid slurry but also effective regulation of the water retention and physical structure of the treated product. The water retention or dewatering capacity of the product has been discussed previously in conjunction with the addition of enzymes and it is sufficient here to mention that recycling of the slurry also affects this property, increased recycling giving improved dewatering capacity. The physical structure of the end product is also influenced by recycling, in particular if recycling is effected by means of a disintegrator pump, such as a ducted wheel pump. In such a pump, the material is greatly comminuted to very small particle size, which can be useful in achieving simple spreading of the finished product. The particle comminution is also of value in the degradation process, since the small particle size involved entails that the turnover rate and speed of the degradation reaction are stabilized and optimized.

The above-described parameters, viz: particle size, dry content, pH, enzyme addition, pre-heating, gas supply and agitation entail a far-reaching optimization of the process. However, for complete optimization, the temperature and staytime of the microbially degradable substance in the degradation reaction itself must also be regulated. The present invention calls for a regulation of the temperature so as to lie between 40–80° C, preferably between 55–65° C and, as was previously mentioned, this temperature regulation is effected by means of external heat-exchangers which are preferably placed in conjunction with the circulation and mixing pump or fan. Naturally, it is also possible to provide the reaction vessel with a cooling mantle which takes care of the excess heat produced. The staytime is dependent upon the remaining process parameters but the process as a whole is very rapid and complete degradation is normally achieved in a shorter time than 10 days. Normally, the degradation treatment is carried out for a time of from 0.1–5 days, the shorter treatment times coming into question when all of the process parameters are at the optimum level and when total degradation is not required.

When the degradation treatment is completed, the slurry is removed from the degradation reactor and subjected to dewatering. The dewatering is carried out in a suitable manner, such as by filtering, sedimentation, deposition/flocculation and the like, but a method of dewatering which is particularly preferred according to the present invention is the so-called "microflotation" process, in which extremely small micro-gas bubbles are created in the slurry in that pressurized liquid containing dissolved gas is introduced into the slurry. When the pressurized liquid is introduced into the slurry, the pressure in the pressurized liquid falls and the dissolved gas is released in the form of an amount of very small bubbles which rise upwardly and entrain the particles in the slurry. For closer details concerning such microflotation, the reader is referred to, for example, Swedish patent application No. 7414758-8.

Once the slurry has been dewatered to the requisite extent, the compost product thus obtained is enriched by an addition of N, P, and/or K, micro-substances and slaked lime. The thus enriched product can thereafter be given the desired form, for example, pellets. Because of its content of valuable substances, such as organically bonded nitrogen, mull content etc., the end product obtained according to the present invention is extremely well suited as a fertilizer and soil improver. It has quite surprisingly proved that the fertilizer obtained according to the present invention displays antibiotic properties vis-a-vis plant diseases, for example, in use as a fertilizer for tomatoes. It should further be observed that the process according to the present invention makes possible the production of a large number of different qualities of fertilizer and soil improver in the same installation by a variation of the enriching additives N, P, K, and the micro-substances; by a variation of the addition of slaked lime whereby the pH of the product is changed; and by a variation of the recycling of the slurry whereby the water retention and physical structure of the product are changed, etc. Thus, it is clear that the process according to the present invention permits high flexibility and control for realizing the desired end product.

The above-described process according to the present invention entails rapid, far-reaching and well-defined degradation processes. The present invention has provided the art with a process technique which in relation to conventional prior art processes is reliable, dynamic optimation of the processes being possible while significant variations and parameters are taken into account, suboptimation being thus avoided. By the improved technique according to the present invention, organic material from different sources is composted and stabilized by aerobic, primarily thermophilic degradation. Such sources are sludge, including raw sludge, digested sludge, chemical sludge, etc., waste water from the pulp and other forestry industries, the food-stuffs industry, certain sectors of the textile industry, as well as municipal waste water treatment plants. Other putrefiable organic waste can be treated by the process according to the present invention, for example, waste from communal kitchens, waste from tips and much else.

As was mentioned previously, the liquid phase composting according to the present invention can, surprisingly enough, replace conventional anaerobic digestion chambers in waste water treatment plants for sludge stabilization and also all biological stages. By the combination with biological reduction of nutrient salts (phosphorus, nitrogen, etc.) with, for example, algae such as in the so-called Nakskov process, totally biological purification plants utilizing novel technology can be constructed.

The above-described degradation process according to the invention is surprisingly simple to control with automatic process surveillance. Simplicity in machinery and the stability of the process as compared with conventional processes entail that surveillance can be effected by means of a single or a few parameters, such as temperature, $CO_2$ content, time, etc. It is possible to control the process with the process time as parameter, this involving very simple hardware, substantially merely differently connected synchronizer clocks.

Finally, the present invention may be more readily understood from the following illustrative but not restrictive Examples.

EXAMPLE 1

Undigested biosludge from a municipal waste water treatment plant was treated in accordance with the invention in the following manner:

A sludge suspension with a dry matter content of 4.5% and sludge particles substantially in the range 0.1–1.5 mm was continuously supplied to the apparatus described below at a volume rate of 2.0 l/min.

The apparatus consisted of three series-connected tank reactors with volumes of 2, 1, and 1 $m^3$, respectively. Agitation was effected externally by means of centrifugal pumps with suction withdrawal means in the conical bottoms of the circular tanks and with tangential rinsing in the upper regions of the tanks. The capacities of the pumps were adapted such that the turnover in the tanks through the agitation pumping was 10 min. Transfer of the suspension between the tanks and out to a discharge was effected by branch conduits on the pressure side of the pumps, the flow being regulated by means of normal needle valves. Injectors which were placed on the pressure side ahead of the tangential inlet in the reactors took care of air intake and effective air mixing.

With a total apparatus volume of 4 $m^3$, the total stay-time was 33 h. During this time the temperature was raised to and maintained at 60° C and in-flowing suspension was pre-heated by heat-exchange with the reaction mixture. The addition of air was 0.5 l of air per liter of suspension and minute. About 4 h. prior to adjustment at stationary condition, each of the reactors had been inoculated with 15 g of freeze-dried thermophilic inoculation culture slurried in water. In the agitation in the reactors, intermittent operation was used, the ratio of down-time to operation-time being 5 min:5 min.

In this experiment, a reduction of $BS_7$ of 91.2% was obtained. The number of living micro-organisms in the discharge flow measured on red agar at 35° C and 24 h was zero (0)/ml. The number of living parasite eggs was also zero/ml.

EXAMPLE 2

In a manner similar to that in Example 1, raw sludge thickened to 2.7% (primary sludge) from a waste water treatment plant was treated. The volume flow in the continuous process was 3.7 l/min., that is to say, the total stay-time was 17.5 h. Amylase in a concentration of 0.2% calculated on the amount of dry organic substance was added to the reaction mixture in the first reactor. No special inoculation culture was used, use being made instead of recirculation of active organic substance from previously obtained and described stationary condition with undigested sludge. Otherwise, the experiment conditions were the same as in Example 1.

In the experiment, a reduction of $BS_7$ by 93.6% was obtained. The number of living micro-organisms in the out-flow measured on red agar at 35° C and 24 h was zero (0)/ml. The number of living parasite eggs was also zero/ml.

What we claim and desire to secure by Letters Patent is:

1. A process for aerobic substantially thermophilic degradation in the liquid phase of microbially degradable substances comprising the sequential steps of:
   (a) reducing the particle size of the substance to a maximum of 50 mm;

(b) mixing the substance with a liquid to a dry content of not greater than 15 percent by weight, thereby producing a slurry;

(c) controlling the pH of the slurry to a maximum of 12;

(d) adding enzyme in a sufficient amount to promote degradation;

(e) preheating the slurry to a temperature of 40-80° C at a time not prior to the introduction of said enzyme;

(f) subjecting the slurry to a continuous, aerobic, substantially thermophilic degradation treatment by action of aerobic, thermophilic and/or facultative micro-organisms in the presence of air for a period not greater than 10 days while maintaining the slurry temperature between 40 and 80° C; and utilizing at least a portion of the active sludge so formed for inoculating untreated slurry and dewatering the remaining slurry.

2. The process of claim 1 in which the aerating gas is added during the degradation treatment separately from activating solution or other liquid.

3. The process of claim 2 in which addition of the aerating gas is done by means of an injector.

4. The process as recited in claim 1, wherein the microbially degradable substance consists of sludge from a waste water treatment plant or from industry.

5. The process as recited in claim 1, wherein the microbially degradable substance consists of thickened waste sludge from the forestry industry, food-stuffs industry, fermentation industry, waste water treatment plants or other organic, biologically active matter such as scraps from the food-stuffs industry, sorted waste from communal kitchens and households and the like.

6. The process as recited in claim 1, wherein the dry content is regulated to from 1-12% by weight.

7. The process as recited in claim 1, wherein the particle size of the microbially degradable substance is reduced, prior to or during the degradation, to from 0.0001-10 mm.

8. The process as recited in claim 1, wherein the pH of the slurry is regulated to from 3.5-10.

9. The process as recited in claim 1, wherein degradation-promoting enzyme selected from the group consisting essentially of amylases, lipases and proteinases is added to the slurry.

10. The process as recited in claim 1, wherein the slurry is inoculated, prior to or during the degradation treatment, by the separate addition of a culture containing micro-organisms.

11. The process as recited in claim 1, further comprising adding to the slurry during the degradation treatment up to 25 liters of air per liter of slurry and second, preferably from 0.05-10 liters per liter of slurry and minute.

12. The process as recited in claim 1, wherein the air is introduced and finely-divided in the slurry by means of an injector.

13. The process as recited in claim 1, wherein the slurry is, at least for periods during the degradation treatment, subjected to intensive agitation.

14. The process as recited in claim 13, wherein the slurry is agitated by means of pumping.

15. The process as recited in claim 14, wherein the particles of the slurry are, during the pumping operation, at the same time ground to reduced particle size.

16. The process as recited in claim 1, wherein the degradation treatment is carried out for from 0.1-5 days.

17. The process as recited in claim 1, wherein vapour formed in the degradation treatment is condensed, and wherein heat produced during the condensation is utilized for pre-heating slurry which is to be degradation treated.

18. The process as recited in claim 1, wherein the slurry is de-watered by microflotation treatment or filter treatment.

19. The process as recited in any claim 1, wherein N, P, K, micro-substances or slaked lime are added to the ready-treated and de-watered slurry.

* * * * *